(12) United States Patent
Franklin et al.

(10) Patent No.: US 10,200,510 B2
(45) Date of Patent: Feb. 5, 2019

(54) METHOD AND APPARATUS FOR LOADING WEB PAGE (71) Applicant: Samsung Electronics Co., Ltd., Suwon-si, Gyeonggi-do (KR)

(72) Inventors: Antony Franklin, Suwon-si (KR); Ji-Cheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 604 days.

(21) Appl. No.: 14/713,382

(22) Filed: May 15, 2015

(65) Prior Publication Data

US 2015/0334160 A1    Nov. 19, 2015

Related U.S. Application Data

(60) Provisional application No. 61/993,684, filed on May 15, 2014.

(51) Int. Cl.
*G06F 15/16* (2006.01)
*H04L 29/06* (2006.01)
*H04W 8/24* (2009.01)
*H04L 29/08* (2006.01)

(52) U.S. Cl.
CPC ........... *H04L 69/163* (2013.01); *H04W 8/245* (2013.01); *H04L 67/02* (2013.01)

(58) Field of Classification Search
CPC ......... H04L 67/02; H04L 29/08; H04L 29/06; H04L 69/163
USPC ........................................................ 709/203
See application file for complete search history.

(56) References Cited

U.S. PATENT DOCUMENTS

| 5,826,031 A | 10/1998 | Nielsen |
| 6,789,075 B1 | 9/2004 | Nielsen |
| 2009/0161554 A1* | 6/2009 | Agarwal ............. H04L 41/0631 370/241 |

(Continued)

FOREIGN PATENT DOCUMENTS

WO    WO 2012148214 A2 *  11/2012    ........... H04L 69/163

OTHER PUBLICATIONS

Daniel K. Blandford et al., Smartacking: Improving TCP Performance from the Receiving End, Journal of Internet Engineering, vol. 1, No. 1, Jan. 2007.

(Continued)

*Primary Examiner* — Michael Won
*Assistant Examiner* — Karina J Garcia-Ching
(74) *Attorney, Agent, or Firm* — Jefferson IP Law, LLP (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE).
A method for receiving objects of a web page by a terminal is provided. The method includes determining sizes of the objects, determining a number of Transmission Control Protocol (TCP) connections to be allocated for each of a plurality of domains connected to the web page, based on estimated sizes of the objects, determining a reception order of the objects to be received in the domains for each domain based on a size of a Congestion Window (CWND) of a server, and receiving the objects in the determined reception order.

11 Claims, 6 Drawing Sheets

(56) References Cited

U.S. PATENT DOCUMENTS

| | | | | |
|---|---|---|---|---|
| 2012/0317496 A1* | 12/2012 | Liu | ................... | G06F 17/30905 |
| | | | | 715/748 |
| 2013/0311614 A1* | 11/2013 | Salkintzis | ............. | H04W 76/15 |
| | | | | 709/219 |
| 2014/0258365 A1* | 9/2014 | L'Heureux | ............. | H04L 69/16 |
| | | | | 709/203 |
| 2014/0297723 A1* | 10/2014 | Wada | ................ | G06F 17/30902 |
| | | | | 709/203 |

OTHER PUBLICATIONS

SPDY: An experimental protocol for a faster web, The Chromium Projects, Google Whitepaper.

\* cited by examiner

METHOD AND APPARATUS FOR LOADING WEB PAGE

CROSS-REFERENCE TO RELATED APPLICATION(S)

This application claims the benefit under 35 U.S.C. § 119(e) of a U.S. Provisional application filed on May 15, 2014 in the U.S. Patent and Trademark Office and assigned Ser. No. 61/993,684, the entire disclosure of which is hereby incorporated by reference.

TECHNICAL FIELD

The present disclosure relates to a method and apparatus for efficiently loading a web page.

BACKGROUND

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a 'Beyond 4G Network' or a 'Post Long-Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time required for loading a web page in a web browser or web applications depends on some factors such as a design of the web page, an algorithm of the web browser, a Round Trip Time (RTT) between a user and a server, network parameters like a communication bandwidth, and so forth.

Generally, on a web page, there are various objects such as a Hyper Text Markup Language (HTML) page, a Cascaded Style Sheet (CS S), a JavaScript, an image, and the like. A network consumes a significant amount of time to receive all embedded objects for a web page to be displayed.

Web objects of the related art are received according to a reference order of corresponding objects in a main HTML page. Some of objects referred to through JavaScript are received after execution of JavaScript. Since web objects are received over a Transmission Control Protocol (TCP) connection, the effective network throughput is underutilized.

Due to a slow start phase of a TCP mechanism, web developers use multiple domains to open up many parallel TCP connections between a terminal and a server. This method is called domain sharding. In domain sharding, a web browser of the terminal may check only a domain name, and a plurality of domain names may be in a physical server having one IP address.

For reference, a web browser has a limitation on a number of parallel TCP connections, and typically, the number of parallel TCP connections allowed for the web browser is limited to 6. Meanwhile, to receive multiple objects on several domains having the limited TCP connections, reception optimization is needed to minimize a Page Loading Time (PLT) by efficiently performing reception.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for reducing a Page Loading Time (PLT).

Another aspect of the present disclosure is to provide a method and apparatus for determining a number of Transmission Control Protocol (TCP) connections to be allocated for each domain to receive objects included in a web page.

Another aspect of the present disclosure is to provide a method and apparatus for determining a reception order of objects included in a web page.

In accordance with an aspect of the present disclosure, a method for receiving objects of a web page by a terminal is provided. The method includes determining sizes of the objects, determining a number of TCP connections to be allocated for each of a plurality of domains connected to the web page, based on estimated sizes of the objects, determining a reception order of the objects to be received in the domains for each domain based on a size of a Congestion Window (CWND) of a server, and receiving the objects in the determined reception order.

In accordance with another aspect of the present disclosure, a terminal apparatus for receiving objects of a web page is provided. The terminal apparatus includes a controller configured to determine sizes of the objects, to determine a number of TCP connections to be allocated for each of a plurality of domains connected to the web page, based on estimated sizes of the objects, to determine a reception order of the objects to be received in the domains for each domain based on a size of a CWND of a server, and to receive the objects in the determined reception order and a browser configured to receive the objects in the determined reception order.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various embodiments of the present disclosure, and similarly, a second element may be named as a first element. The term "and/or" includes a combination of a plurality of related provided items or any one of the plurality of related provided items.

An apparatus and method proposed in the present disclosure may be applied to various communication systems such as a Long-Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of the $3^{rd}$ Generation Project Partnership 2 (3GPP2), a Wideband Code Division Multiple Access (WCDMA) mobile communication system of the 3GPP2, a CDMA mobile communication system of the 3GPP2, the Institute of Electrical and Electronics Engineers (IEEE) 802.16m communication system, an Evolved Packet System (EPS), a Mobile Internet Protocol (Mobile IP) system, and so forth.

Before various embodiments of the present disclosure are described, the main concept of the present disclosure will be described in brief.

The basic concept of a web page loading scheme proposed in the present disclosure is determining a reception order of objects based on a size of a Congestion Window (CWND) of a sender and sizes of objects to be received. For reference, herein, an operation of determining a reception order of objects may be referred to as "scheduling."

The web page loading scheme proposed in the present disclosure may be applied to a web browser and a web application of a user terminal (hereinafter, simply referred to as a "terminal") such as a Personal Computer (PC), a tablet PC, a smart phone, or the like.

FIGS. 1 through 6, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
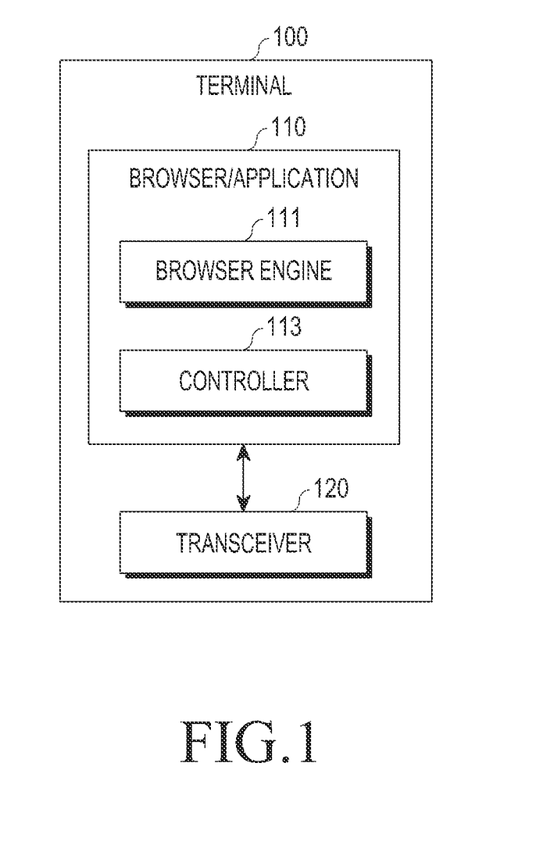
FIG. 1 is a block diagram illustrating a structure of a terminal according to an embodiment of the present disclosure.

FIG. 1 is a block diagram illustrating a structure of a terminal according to an embodiment of the present disclosure.

Referring to FIG. 1, a terminal 100 is illustrated, where the terminal 100 may include a browser/application 110 (hereinafter, simply referred to as a "browser") and a transceiver 120. The transceiver 120 performs data transmission and reception with a server (not shown). The browser/application 110 may include a browser engine 111 and a controller 113. The controller 113 receives objects of a web page received through the transceiver 120 and performs reception optimization for the objects to deliver the objects to the browser engine 111, according to a method proposed in the present disclosure. The browser engine 111 receives the objects and loads the web page.

Figure 2:
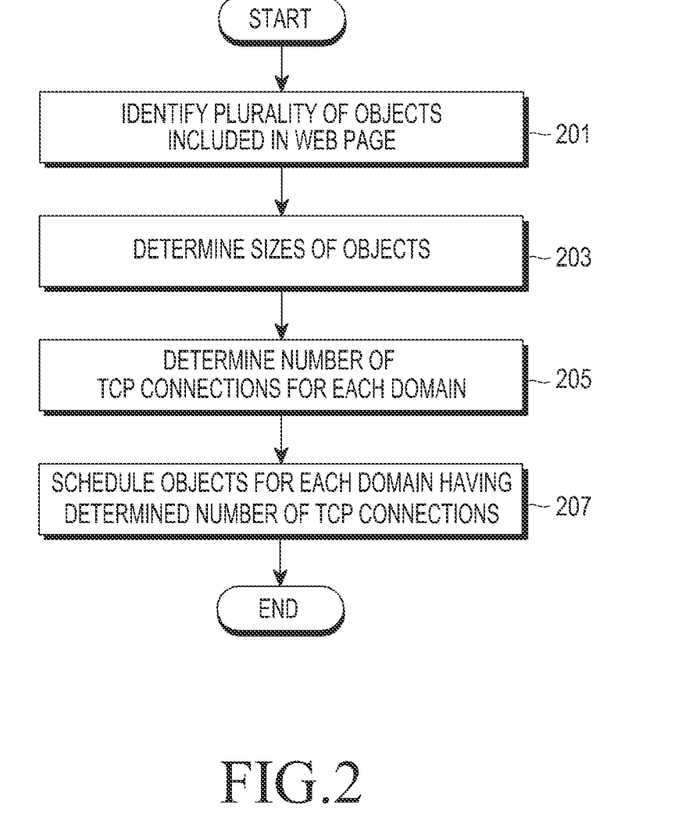
FIG. 2 is a flowchart illustrating a method for loading a web page according to an embodiment of the present disclosure.

FIG. 2 is a flowchart illustrating a method for loading a web page according to an embodiment of the present disclosure.

Referring to FIG. 2, a flowchart is illustrated, such that in operation 201, a terminal identifies a plurality of objects included in a web page by analyzing information associated with the web page. The information associated with the web page refers to information describing a configuration of the web page, and may be, for example, a Hyper Text Markup Language (HTML) file and/or Cascaded Style Sheet (CSS) files. For reference, a CSS file is a style sheet which previously stores therein an overall style of a web document, and the CSS file may maintain overall consistency of the web page when compared to an HTML, and reduce a need to designate a detailed style used in the web page.

Upon receiving JavaScripts included in the web page, the terminal may scan a Java code or run JavaScript in advance to identify embedded objects.

Once the objects are identified, the terminal classifies the objects into critical (or important) resources and non-critical (unimportant) resources according to a general web page design principle. An example of a critical resource may be an Index.html file, a CSS, or a JavaScript included in an HTML header. An example of a non-critical resource may be a JavaScript defined in an HTML ending part, images, or a flash.

In another embodiment where information about critical/non-critical resources is classified, the server may indicate "critical/non-critical" by using special tags in the HTML page/header.

The reason for classification according to criticality (or importance) of objects is that a delay of a critical resource that may affect an initial rendering time of the web page is not preferable because the objects are to be received based on their sizes in the present disclosure, such that critical objects need to be received preferentially.

In operation 203, the terminal determines sizes of the objects identified in operation 201.

Object size determination may be performed by statistically estimating the object sizes based on types of the objects or by using size information of the objects, included in the information associated with the web page or a separate signaling message. A detailed example is provided below.

In an embodiment of the present disclosure, an HTML page provides only objects and types of the objects, such that a file size of an object may differ from object to object. Thus, to determine a size of an object for different file types of objects, various methods may be used. For example, for an HTML, a CSS, and a JavaScript, an object size may be statistically estimated. For an image object, the size of the object may be estimated based on an image type and an image resolution. Statistic estimation of predetermined size and type may be performed in a terminal In another embodiment, the size of an object may be embedded in an HTML page.

In another embodiment, the size of an object may be provided to the terminal by the server through explicit messages.

In operation 205, the terminal determines a number of Transmission Control Protocol (TCP) connections for each domain (or domain-specific TCP connections) based on the sizes of objects to be received in each domain. A detailed process of operation 205 will be descried with reference to FIG. 3.

Figure 3:
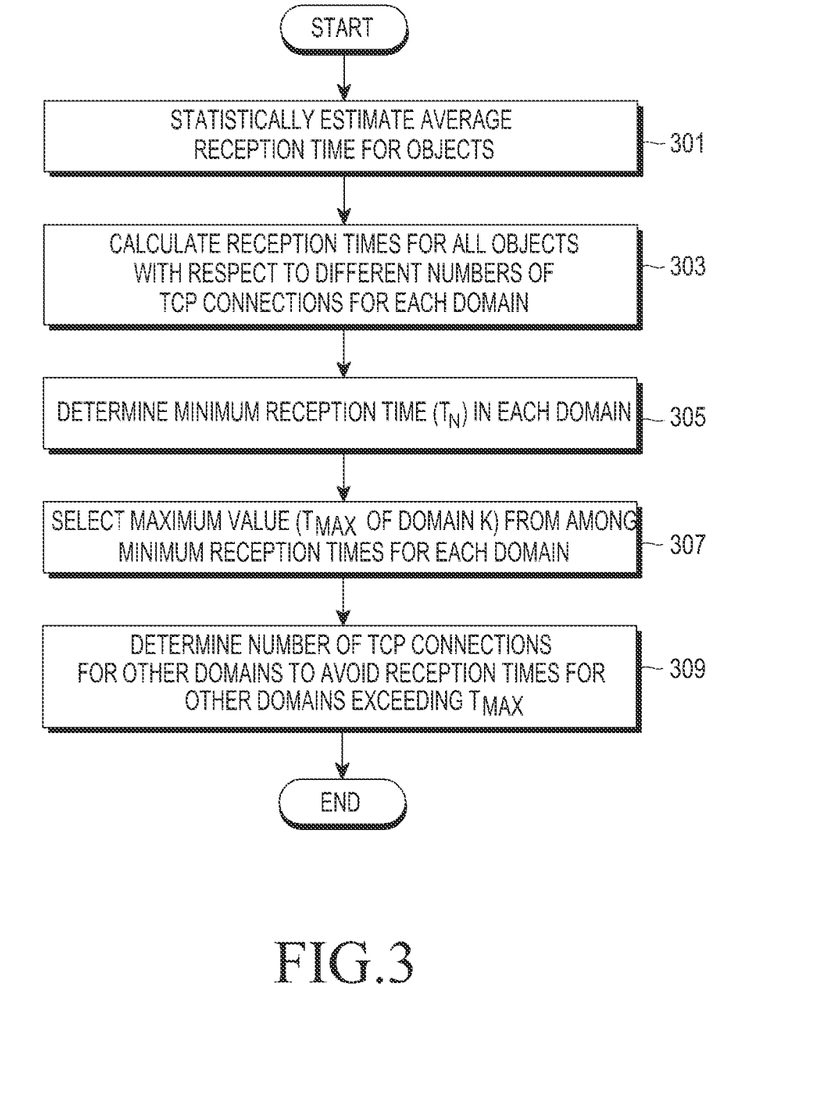
FIG. 3 is a flowchart illustrating a process of determining a number of Transmission Control Protocol (TCP) connections per domain according to an embodiment of the present disclosure.

FIG. 3 is a flowchart illustrating a process of determining a number of domain-specific TCP connections according to an embodiment of the present disclosure.

Referring to FIG. 3, a flowchart is illustrated, such that in operation 301, a terminal statistically estimates an average reception time for objects having different sizes based on a Maximum Segment Size (MSS) unit per domain. The MSS means a maximum size of a segment permitted in reception of an object, and a time for receiving the object may be determined by the number of MSSs necessary for reception of the object.

In operation 303, the terminal calculates a time for receiving each object (or a reception time for each object) with respect to different numbers of TCP connections for each domain.

In operation 305, the terminal determines a minimum reception time $T_N$ in each domain. Herein, N indicates an index of a domain.

In operation 307, the terminal selects a maximum value ($T_{MAX}$ of a domain K) from among domain-specific minimum reception times determined in operation 305.

In operation 309, the terminal determines the number of TCP connections for other domains, such that a reception time for each of the other domains may not exceed the maximum value $T_{MAX}$.

The foregoing process will be described using an example. It is assumed that a web page includes 10 objects O1, O2, . . . , O10 having different sizes; <O1, O2, O3> out of the 10 objects are received in a first domain D1 among four domains D1, D2, D3, and D4; <O4, O5> are received in a second domain D2; <O6, O7, O8> are received in a third domain D3; and <O9, O10> are received in a fourth domain D4.

Under the above assumption, the method illustrated in FIG. 3 will be described.

In operation 301, an average reception time for objects to be received in the domains D1, D2, D3, and D4 is estimated.

In operation 303, a reception time for each of the objects O1, O2, and O3 received in the domain D1 is estimated when the domain D1 has one TCP connection. In addition, a reception time for each of the objects O1, O2, and O3 is calculated when the domain D1 has two TCP connections. In the same manner, a reception time for each of the objects O1, O2, and O3 is calculated in each of cases where the domain D1 has three through six TCP connections. This process is equally applied to the domains D2, D3, and D4, to calculate a reception time for each object to be received in each domain.

In operation 305, the terminal calculates a domain-specific minimum reception time based on an object-specific reception time calculated in operation 303. As a result, it is assumed that a minimum reception time $T_1$ in the domain D1 is determined to be 400 ms, a minimum reception time $T_2$ in the domain D2 is determined to be 200 ms, a minimum reception time $T_3$ in the domain D3 is determined to be 800 ms, and a minimum reception time $T_4$ in the domain D4 is determined to be 350 ms.

In operation 307, the terminal determines a maximum value among $T_1$ through $T_4$ as $T_{MAX}$. In this example, $T_{MAX}=T_3=800$ ms.

In operation 309, the terminal determines the number of TCP connections in the domains D1, D2, and D4, such that the reception times in the domains D1, D2, and D4 do not exceed $T_{MAX}=T_3=800$ ms. For reference, the number of TCP connections in the domain D3 is set to the number of TCP connections corresponding to $T_3=800$ ms. When determining the number of domain-specific TCP connections, the terminal may equally distribute objects to TCP connections of each domain based on sizes of objects received in each domain.

Referring back to FIG. 2, in operation 207, each object is scheduled for each domain having the number of TCP connections determined in operation 205. In the present disclosure, reception of each object is scheduled based on a size of a CWND in a TCP sender, that is, a server. For reference, the size of the CWND is determined in the server and may not be determined in the terminal. However, the server may adjust the size of the CWND in response to a response signal (Acknowledgement (ACK)/Negative ACK (NACK)) from the terminal. Thus, the terminal may estimate the size of the CWND determined by the server based on the response signal the terminal has transmitted to the server.

Meanwhile, an importance of objects to be received may be determined based on a data size in the manner described in the previous operation. In an embodiment of the present disclosure, importance of the objects is determined based on the sizes of the objects and an object having high importance is preferentially received. In addition, objects requiring the same time to be received in a domain may be grouped. The time required for receiving the objects may be determined based on the number of MSSs. A list of the objects may be updated each time the objects are identified in operation 201.

Figure 4:
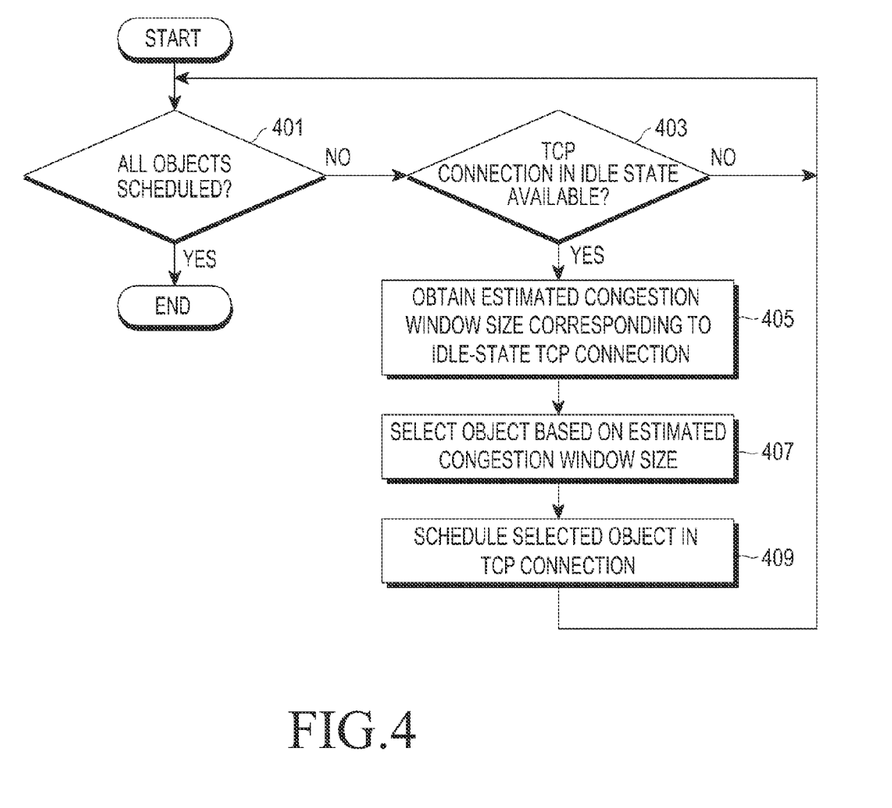
FIG. 4 is a flowchart illustrating a process of scheduling objects according to an embodiment of the present disclosure.

FIG. 4 is a flowchart illustrating a process of scheduling objects according to an embodiment of the present disclosure.

Referring to FIG. 4, a flowchart is illustrated, wherein a scheme for scheduling objects according to the present disclosure selects one object from a list of object groups, taking a CWND size of a TCP connection into account when the arbitrary TCP connection is available among TCP connections being set in one domain. That is, for an available idle-state TCP connection, a CWND size of the TCP connection is estimated, an object is selected based on the estimated CWND size, and the selected object is scheduled over the TCP connection, as will be described in detail below.

Referring to FIG. 4, in operation 401, a terminal determines whether all objects are scheduled; if all objects are scheduled, the terminal terminates the operation. On the other hand, if at least one object has not been scheduled, the terminal proceeds to operation 403.

In operation 403, the terminal determines whether the idle-state TCP connection is available. If, in operation 403, the terminal determines that the TCP connection is not available, the process returns to operation 401. However, if, in operation 403, the terminal determines that the TCP connection is available, then the terminal proceeds to operation 405 to obtain the estimated CWND size corresponding to the idle-state TCP connection.

Next, in operation 407, the terminal selects an object based on the estimated CWND size. Object selection based on the CWND size will be described later.

In operation 409, the terminal schedules the selected object in the TCP connection. After operation 409 the process returns to operation 401.

A scheme for selecting the object based on the CWND size in operation 407 of FIG. 4 will be described below.

As mentioned above, in an embodiment of the present disclosure, for a given TCP, an object is selected based on a currently estimated CWND size. First, an object is selected from a group having a CWND estimated to have the same size. Thereafter, an object is selected from a group having a smaller-size CWND to preferentially receive objects having small sizes. Objects are determined from the group (a current CWND+a next CWND) to schedule objects that may be received during 2 Round Trip Times (RTTs). Objects are then scheduled from a group having the next higher CWND.

Figure 5:
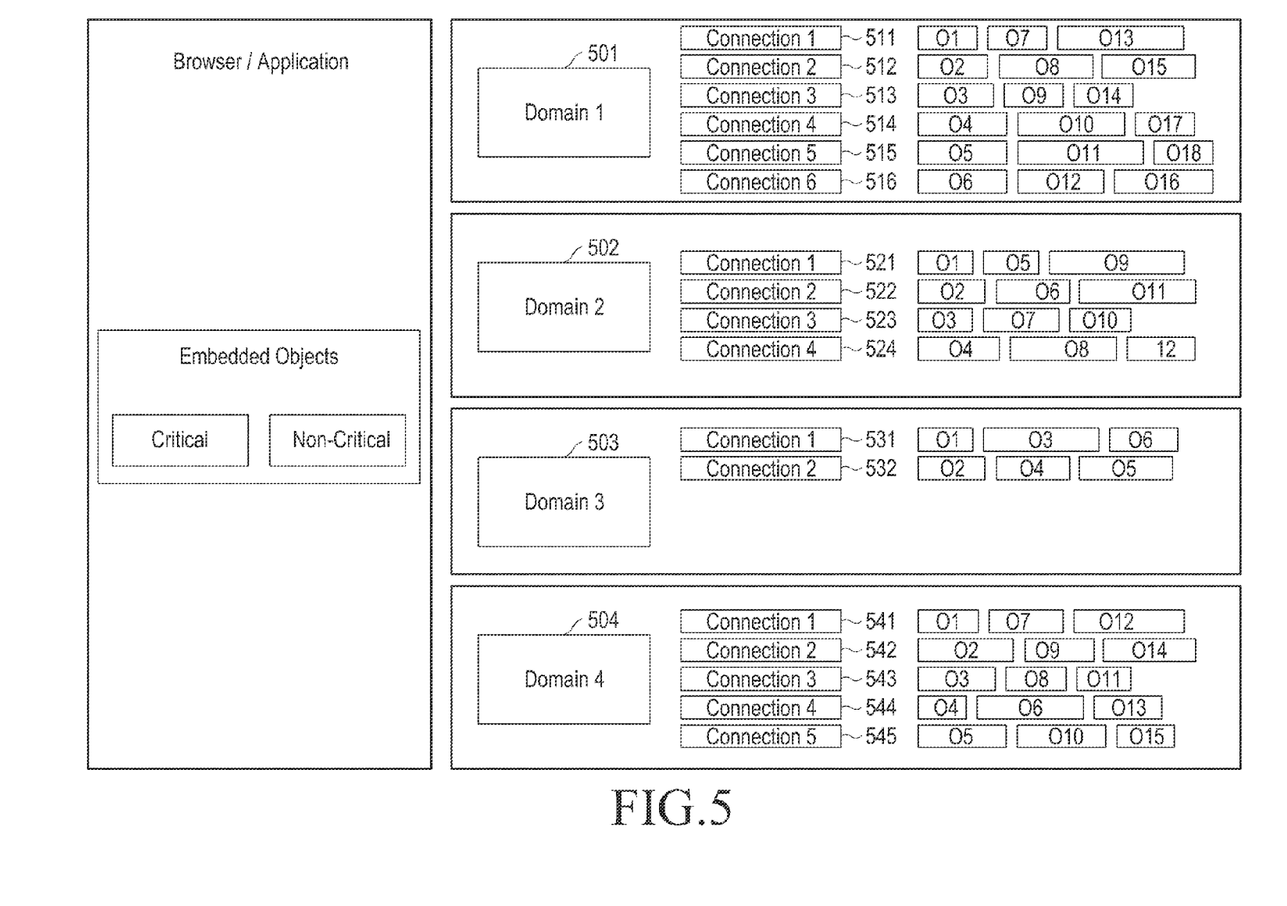
FIG. 5 illustrates an example in which objects are scheduled over respective TCP connections for each domain according to an embodiment of the present disclosure.

FIG. 5 illustrates an example in which objects are scheduled over respective TCP connections for each domain according to an embodiment of the present disclosure.

Referring to FIG. 5, an illustration is provided, wherein critical and non-critical embedded objects are included in a browser/application and wherein four domains D1 501, D2 502, D3 503, and D4 504, six TCP connections 511 through 516 are set in the domain D1 501, four TCP connections 521 through 524 are set in the domain D2 502, two TCP connections 531 and 532 are set in the domain D3 503, and five TCP connections 541 through 545 are set in the domain D4 504. That is, TCP connections are set for each domain based on the number of TCP connections determined for each domain according to the above-described embodiment of the present disclosure.

Referring to FIG. 5, objects to be received over respective TCP connections are scheduled. For example, in a TCP connection 1 511 of the domain D1 501, three objects O1, O7, and O13 are scheduled. In other TCP connections, objects are also scheduled. This example uses object scheduling per domain as described above. FIG. 5 illustrates how additional objects are scheduled for different connections of the different domains 501, 502, 503 and 504.

In the foregoing description, objects have been scheduled, taking an estimated CWND size into account. In another embodiment, objects may also be scheduled without estimation of a CWND size. For example, based on sizes of objects, the objects may be scheduled in an increasing order of size. That is, since the sizes of the objects have already been determined, the objects may be sorted in an ascending order of object size and the objects sorted in the ascending order may be scheduled when a TCP connection is available.

Meanwhile, the performance of scheduling based on CWND size estimation mainly depends on object size estimation. In another embodiment of the present disclosure, the terminal performs scheduling by using a Hyper Text Transfer Protocol (HTTP) range request, without object size estimation.

The HTTP range request may be used to receive an object corresponding to a part specifying the amount of data desired by the terminal. If the HTTP range request is used separately from a partial file, information about an object size may be obtained through a response thereto.

First, each object is partially received based on the current CWND size. In this process, if an actual object size is smaller than a range requested by the HTTP range request from the terminal, some of objects may have been received. The remaining files may be received using the above-described scheduling algorithm according to the present disclosure.

Figure 6:
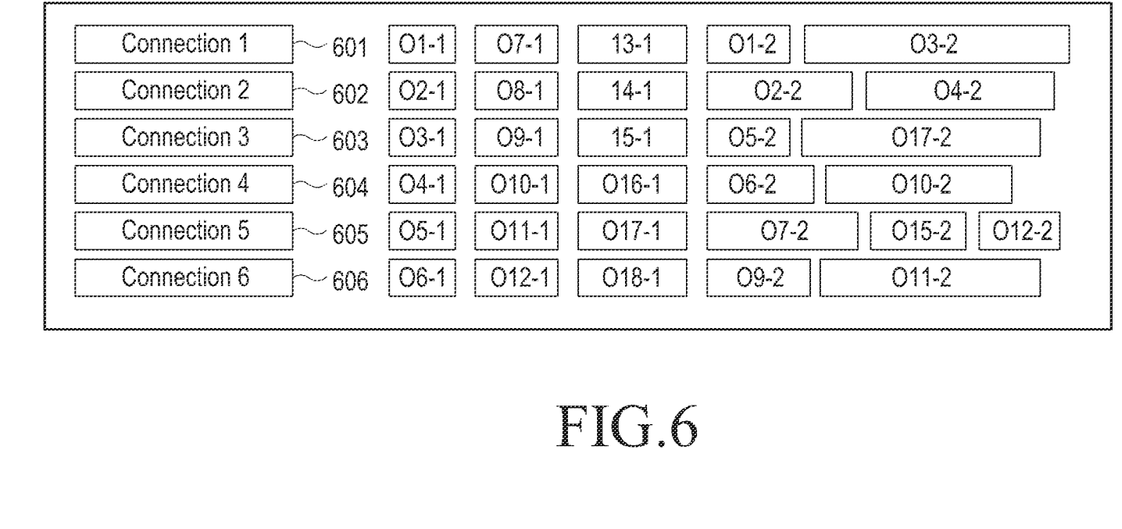
FIG. 6 illustrates an example in which scheduling is performed by a Hyper Text Transfer Protocol (HTTP) range request without an object size estimation of a terminal according to an embodiment of the present disclosure.

FIG. 6 illustrates an example in which scheduling is performed by an HTTP range request without an object size estimation of a terminal according to an embodiment of the present disclosure.

Referring to 6, an illustration is provided, wherein in scheduling using an HTTP range request, each object is divided into two parts. That is, a total of eighteen objects are assumed to be scheduled over six TCP connections 601 through 606. Each of the eighteen objects is divided into two parts. For example, it can be seen that object O1 is divided into parts O1-1 and O1-2, object O2 is divided into parts O2-1 and O2-2, object O3 is divided into parts O3-1 and O3-2, object O4 is divided into parts O4-1 and O4-2, object O5 is divided into parts O5-1 and O5-2, object O6 is divided into parts O6-1 and O6-2, object O7 is divided into parts O7-1 and O7-2, object O8 only has one part O8-1, object O9 is divided into parts O9-1 and O9-2, object O10 is divided into parts O10-1 and O10-2, object O11 is divided into parts O11-1 and O11-2, object O12 is divided into parts O12-1 and O12-2, object O13 only has one part O13-1, object O14 only has one part O14-1, object O15 is divided into parts O15-1 and O15-2, object O16 only has one part O16-1, object O17 is divided into parts O17-1 and O17-2, and the object O18 only has one part O18-1. The sizes of the first parts O1-1 through O18-1 divided from the respective objects O1 through O18 are the same as the currently estimated CWND size.

Once each object is divided into two parts in this way and the first parts O1-1 through O18-1 of the respective objects O1 through O18 are received, the second parts (e.g., O1-2) of the respective objects are scheduled and received using the above-described scheduling according to the present disclosure.

So far, the various embodiments of the present disclosure have been described.

According to the various embodiments of the present disclosure, a time for receiving objects may be optimized and the number of TCP connections may be reduced according to the optimized reception time, thereby efficiently using resources. Moreover, the amount of computation, a memory capacity, and power consumption in the terminal may be reduced.

The foregoing embodiments of the present disclosure may be applied to any web browser and a web application that receive web objects through the HTTP. The mechanism may improve a page loading time when many web objects exist. The HTTP range request mechanism does not need any file size estimation, facilitating implementation.

Particular aspects of the present disclosure may also be implemented as a computer readable code in a computer readable recording medium. The computer readable recording medium may be any type of data storage device that may store data readable by a computer system. Examples of record-mediums readable by the computer may include a Read-Only Memory (ROM), a Random-Access Memory (RAM), a Compact Disc-ROM (CD-ROM), magnetic tapes, floppy disks, optical data storage devices, carrier waves (such as data transmission through the Internet). Further, functional programs, codes and code segments for achieving the present disclosure may be easily interpreted by programmers skilled in the art which the present disclosure pertains to.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While the present disclosure has been shown and described with reference to various embodiments thereof, it will be understood by those skilled in the art that various change in form and details may be made therein without departing from the spirit and scope of the present disclosure as defined by the appended claims and their equivalents.

What is claimed is:

1. A method for receiving objects of a web page by a terminal, the method comprising:
   estimating, by the terminal, a size for each of a plurality of objects;
   determining, by the terminal, a number of transmission control protocol (TCP) connections allocated for each of a plurality of domains connected to the web page, based on reception times of at least one object among the plurality of objects for each of the plurality of domains, the reception times being determined based on the estimated size for different number of TCP connection for each of the plurality of domains;
   determining, by the terminal, based on a size of a congestion window (CWND) of a server, a reception order of the at least one object to be received for each of the plurality of domains having the determined number of TCP connection; and
   receiving, by the terminal, the at least one object in the determined reception order.

2. The method of claim 1, wherein the estimating of the size comprises:
   estimating the size for each of the plurality of objects by one of:
   statistically estimating the size for each of the plurality of objects based on types of the objects,
   using size information regarding the plurality of objects, comprised in information associated with the web page, or
   using size information regarding the plurality of objects, comprised in a separate message received from a server.

3. The method of claim 1, wherein the determining of the number of TCP connection comprises:
   determining an average reception time per object based on the estimated size;
   calculating the reception times based on the determined average reception time;
   determining minimum reception times (TN) for each of the plurality of domains;
   determining a maximum value (TMAX) from among the determined minimum reception times; and
   determining a number of TCP connections for each of domains other than a domain among the plurality of domains having the maximum value (TMAX), such that the reception times for the other domains do not exceed the maximum value (TMAX).

4. The method of claim 1, further comprising:
   determining respective importance of the plurality of objects; and
   receiving objects having high importance with preference according to the determined importance.

5. The method of claim 1, wherein the determining of the reception order comprises:
   estimating a size of a CWND of a TCP connection available in the plurality of domains; and
   selecting an object among the plurality of objects based on the estimated size of the CWND.

6. A terminal apparatus for receiving objects of a web page, the terminal apparatus comprising:
   a memory configured to store instructions therein;
   at least one processor configured, upon execution of the instructions, to:
   estimate a size for each of a plurality of objects,
   determine a number of transmission control protocol (TCP) connection allocated for each of a plurality of domains connected to the web page, based on reception times of at least one object among the plurality of objects for each of the plurality of domains, the reception times being determined based on the estimated size for different number of TCP connection for each of the plurality of domains, and determine, based on a size of a congestion window (CWND) of a server, a reception order of the at least one object to be received for each of the plurality of domains having the determined number of TCP connection; and a browser configured to receive the at least one objects in the determined reception order.

7. The terminal apparatus of claim 6, wherein the at least one processor is further configured to estimate the size by one of:

estimating the size for each of the plurality of objects by one of:

statistically estimating the size for each of the plurality of objects based on types of the objects, using size information regarding the plurality of objects, comprised in information associated with the web page, or using size information regarding the plurality of objects, comprised in a separate message received from a server.

8. The terminal apparatus of claim 6, wherein, to determine the number of TCP connection, the at least one processor is further configured to determine an average reception time per object based on the estimated size;

calculate the reception times based on the determined average reception time;

determine minimum reception times (TN) for each of the plurality of domains;

determine a maximum value (TMAX) from among the determined minimum reception times; and determine a number of TCP connections for each of domains other than a domain among the plurality of domains having the maximum value (TMAX), such that the reception times for the other domains do not exceed the maximum value (TMAX).

9. The terminal apparatus of claim 6, wherein the at least one processor is further configured to:

determine a respective importance of the plurality of objects; and receive objects having high importance with preference according to the determined importance.

10. The terminal apparatus of claim 6, wherein, to determine the reception order, the at least one processor is further configured to:

estimate a size of a CWND of a TCP connection available in the plurality of domains; and select an object among the plurality of objects based on the estimated size of the CWND.

11. The terminal apparatus of claim 6, wherein the at least one processor is further configured to:

determine whether the plurality of objects are scheduled to be received, if all of the objects are not scheduled, determine whether an idle-state TCP connection is available, and if the idle-state TCP connection is available, obtain an estimated CWND size corresponding to the idle-state TCP connection.

* * * * *